(12) United States Patent
Christiansen et al.

(10) Patent No.: US 12,042,355 B2
(45) Date of Patent: Jul. 23, 2024

(54) HANDLING TOOL, DENTAL SET AND METHOD FOR ASSEMBLING A DENTAL COMPONENT

(71) Applicant: NOBEL BIOCARE SERVICES AG, Kloten (CH)

(72) Inventors: Piers Christiansen, Zurich (CH); Fabian Volkart, Zurich (CH); Guillaume Bugnard, Solothurn (CH); Thomas Vizer, Zurich (CH)

(73) Assignee: NOBEL BIOCARE SERVICES AG, Kloten (CH)

( * ) Notice: Subject to any disclaimer, the term of this patent is extended or adjusted under 35 U.S.C. 154(b) by 361 days.

(21) Appl. No.: 16/303,068

(22) PCT Filed: May 19, 2017

(86) PCT No.: PCT/EP2017/062076
§ 371 (c)(1),
(2) Date: Nov. 19, 2018

(87) PCT Pub. No.: WO2017/198807
PCT Pub. Date: Nov. 23, 2017

(65) Prior Publication Data
US 2019/0282340 A1 Sep. 19, 2019

(30) Foreign Application Priority Data

May 20, 2016 (EP) ..................... 16170582

(51) Int. Cl.
*A61C 8/00* (2006.01)
(52) U.S. Cl.
CPC ............ *A61C 8/0089* (2013.01); *A61C 8/005* (2013.01); *A61C 8/006* (2013.01); *A61C 8/0066* (2013.01); *A61C 8/0068* (2013.01)

(58) Field of Classification Search
CPC ....... A61C 8/0089; A61C 8/005; A61C 8/006; A61C 8/0066; A61C 8/0068;
(Continued)

(56) References Cited

U.S. PATENT DOCUMENTS 2,338,023 A * 12/1943 Bugg .................. F16B 23/0046
81/436
4,258,596 A * 3/1981 Bisbing ................. B25B 13/485
81/436
(Continued)

FOREIGN PATENT DOCUMENTS

EP  0 419 431 A1  3/1991
FR  2 733 902 A1  11/1996
(Continued)

OTHER PUBLICATIONS

International Search Report for Application No. PCT/EP2017/062076 dated Oct. 8, 2017 in 3 pages [the ISR for the PCT Application of this US national phase application].

*Primary Examiner* — Edward Moran
*Assistant Examiner* — Matthew P Saunders
(74) *Attorney, Agent, or Firm* — Knobbe, Martens, Olson & Bear, LLP

(57) ABSTRACT

The present invention provides a handling tool (60, 160) for a dental component (20, 40) having a distal end (69, 169), a proximal end (68, 168) and a longitudinal axis L. Further, the handling tool (60, 160) comprises a grip (63, 163) at the proximal end, a shaft (65, 165) located distally of the grip (63, 163) with an engagement section (61, 161) for engaging an engagement feature (32, 132) of a fastening element (30, 130) and a retaining section (62, 162) for retaining the dental component (20, 40) to be fastened by the fastening element (Continued)

(30, 130). The retaining section of the handling tool is configured to allow for a rotation relative to the dental component.

18 Claims, 8 Drawing Sheets

(58) Field of Classification Search
CPC ... A61C 8/0054; A61C 8/0062; A61C 8/0063; A61C 8/0087; F16B 23/003; F16B 21/12; F16B 2/12; B25B 23/08; B25B 23/0085
See application file for complete search history.

(56) References Cited

U.S. PATENT DOCUMENTS

| | | | |
|---|---|---|---|
| 4,856,648 A | 8/1989 | Krueger | |
| 5,030,096 A | 7/1991 | Hurson et al. | |
| 5,105,690 A * | 4/1992 | Lazzara | A61C 8/0089 81/436 |
| 5,145,371 A * | 9/1992 | Jorneus | A61C 8/005 433/173 |
| 5,312,254 A * | 5/1994 | Rosenlicht | A61C 8/005 206/63.5 |
| 5,322,443 A * | 6/1994 | Beaty | A61C 8/0089 433/141 |
| 5,525,314 A | 6/1996 | Hurson | |
| 5,967,305 A | 10/1999 | Blonder et al. | |
| 6,099,311 A * | 8/2000 | Wagner | A61C 8/0089 433/163 |
| 6,159,008 A | 12/2000 | Kumar | |
| 6,217,332 B1 | 4/2001 | Kumar | |
| 6,431,866 B2 * | 8/2002 | Hurson | A61C 8/005 433/172 |
| 6,827,575 B1 * | 12/2004 | Jorneus | A61C 8/005 433/174 |
| 6,948,408 B1 * | 9/2005 | Lee | F16B 23/0038 81/436 |
| 8,029,282 B2 * | 10/2011 | Carter | A61C 8/0089 433/163 |
| 8,282,395 B2 * | 10/2012 | Schaffran | A61C 8/0089 433/173 |
| 8,347,761 B2 * | 1/2013 | Goss | B25B 13/065 81/121.1 |
| 8,585,339 B2 * | 11/2013 | Ishikawa | A61C 8/008 411/408 |
| 9,358,060 B2 * | 6/2016 | Jerke | A61B 17/8877 |
| 2003/0054318 A1 * | 3/2003 | Gervais | A61C 8/0066 433/141 |
| 2003/0054319 A1 * | 3/2003 | Gervais | A61C 8/0066 433/173 |
| 2003/0228556 A1 * | 12/2003 | Giorno | A61C 8/0089 433/174 |
| 2006/0081093 A1 * | 4/2006 | Grimes | B25B 13/48 81/176.1 |
| 2008/0050698 A1 * | 2/2008 | Carter | A61C 8/0089 433/163 |
| 2011/0008752 A1 * | 1/2011 | Schaffran | A61C 8/0089 433/214 |
| 2013/0004915 A1 * | 1/2013 | Bellanca | A61C 8/0018 433/173 |
| 2013/0004916 A1 * | 1/2013 | Bellanca | A61C 8/0057 433/173 |
| 2013/0230825 A1 * | 9/2013 | Kenk | A61C 8/0089 433/163 |
| 2014/0011160 A1 | 1/2014 | Jorneus et al. | |
| 2014/0227661 A2 * | 8/2014 | Guenter | A61C 8/0087 433/163 |
| 2014/0295374 A1 * | 10/2014 | Jo | A61C 8/0018 433/147 |
| 2015/0250565 A1 * | 9/2015 | Gustafsson | B25B 23/1415 433/127 |
| 2018/0132977 A1 * | 5/2018 | Durr | A61C 8/005 |
| 2019/0029779 A1 * | 1/2019 | Vonwiller | A61C 8/0062 |

FOREIGN PATENT DOCUMENTS

| | | |
|---|---|---|
| JP | 2001 299777 A | 10/2001 |
| KR | 101181924 B1 * | 9/2012 |
| KR | 20140062212 A * | 5/2014 |
| WO | WO 95/24163 A1 | 9/1995 |
| WO | WO 00/09031 | 2/2000 |
| WO | WO 2006/138351 A2 | 12/2006 |
| WO | WO 2008/116834 A1 | 10/2008 |
| WO | WO 2013/004386 A1 | 1/2013 |

* cited by examiner

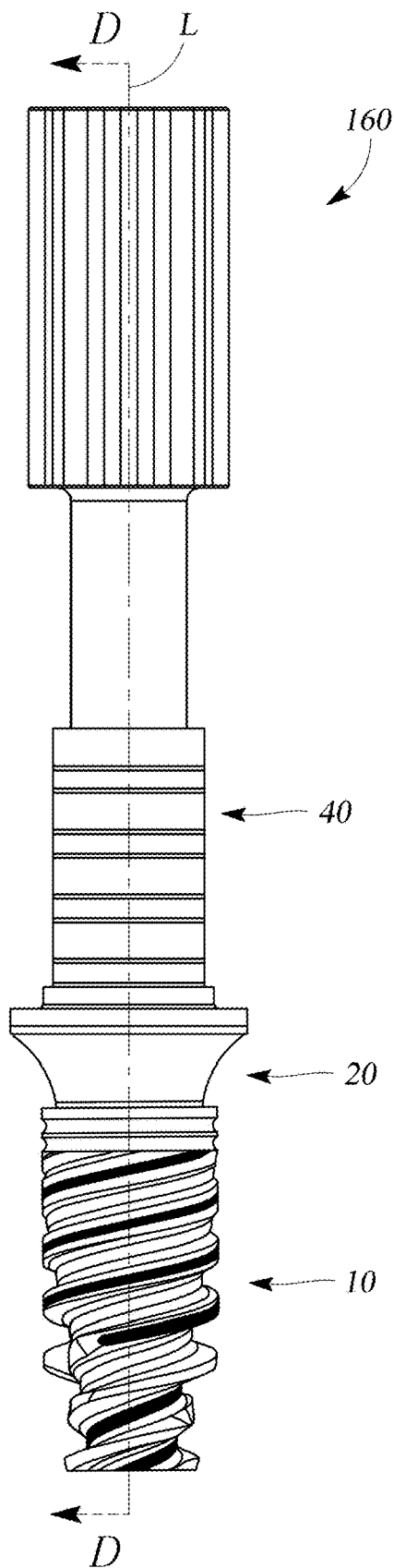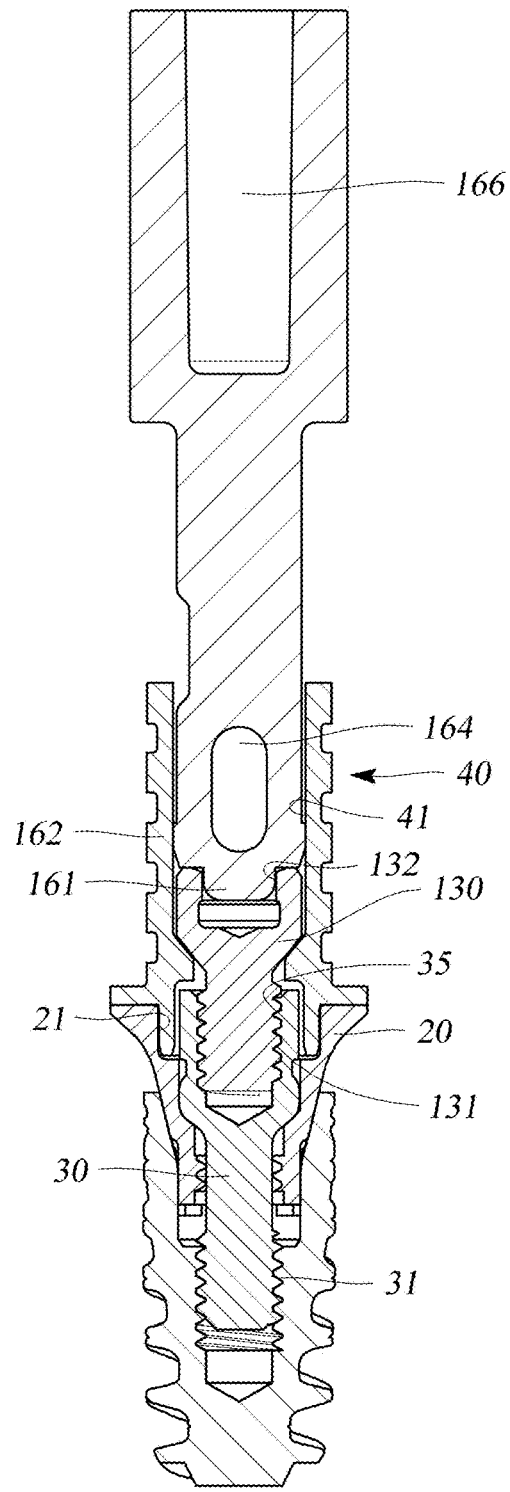
FIG. 7A
FIG. 7B

HANDLING TOOL, DENTAL SET AND METHOD FOR ASSEMBLING A DENTAL COMPONENT

CROSS-REFERENCE TO RELATED APPLICATIONS

This application is a national stage application under 35 U.S.C. § 371 of International Application No. PCT/EP2017/062076, filed on May 19, 2017, which published in English as WO 2017/198807 A1 on Nov. 23, 2017, and which claims priority benefit of EP Patent Application No. 16170582.7, filed on May 20, 2016.

TECHNICAL FIELD

The present invention relates to a handling tool for a multi-unit abutment, a dental set comprising a handling tool and a method for installing a multi-unit abutment on a dental component. It also relates to a handling tool preassembled with a dental component and a fastening element.

BACKGROUND OF THE INVENTION

After an implant has been implanted in a patient's upper or lower jaw bone and is integrated in the bone tissue after a healing period or immediately after surgery, at least one dental component will be attached to this implant in order to install a dental prosthesis. The dental prosthesis may comprise a plurality of dental components such as an abutment, a multi-unit abutment, a spacer, and a replica of a at least one tooth. Generally, fastening elements such as dental screws are used for fixing these dental components to the implant.

Since dental components and dental screws are in general rather small in size, it is generally advantageous to use tools for handling and fastening these components to an implant. Originally, two separate tools have been used, one for handling the dental component and the other one for tightening the dental screw.

More recently, handles have been introduced that handle both a dental screw and a dental component. Such a handle is, for example, known from U.S. Pat. No. 6,827,575 B1. Here, a spacer and a screw are engaged with a holder in a rotationally fixed position with respect to the holder. More specifically, the spacer is engaged in a spacer engaging portion of the holder and the screw is engaged in a screw engaging portion of the holder. For fixing the spacer to an implant, the screw is brought into engagement with a thread of the implant and tightened by applying a rotational motion to the holder. During fastening, both the rotationally fixed spacer and the dental screw are rotated until the spacer abuts a coronal side of the implant.

Although the handle of U.S. Pat. No. 6,827,575 B1 considerably facilitates the handling and attachment of the spacer, such a handle cannot be used if indexing means are present between the dental implant and the dental component. Indexing means are generally intended for preventing any relative rotation between two dental components in order to set a predetermined orientation of the dental prosthesis.

Applying the handle of U.S. Pat. No. 6,827,575 B1 to a dental component such as an implant and an abutment that include an indexing means will, thus, not result in the dental components being fastened to the dental implant. As soon as the indexing means between the dental implant and the abutment are in engagement, the handle holding the screw and the dental component will start turning the implant, which is obviously undesirable since it may result in loosening the implant.

SUMMARY OF THE INVENTION

Consequently, an objective of the present invention was to provide a tool that allows to handle as well as tighten a dental component to another dental component such as an implant, even if the dental components include indexing means that prevent any relative rotation between these dental components.

Another objective was to provide a handling tool giving a better tactile feedback about the installation process to a user. At the same time, it was an aim of the invention to give the option of a dental screw being preassembled to a dental component in order to facilitate handling and to reduce the risk of contamination.

As a solution, the invention provides a handling tool for a dental component having a distal end, a proximal end and a longitudinal axis. Further, the handling tool comprises a grip at the proximal end and a shaft located distally to the grip. The shaft comprises an engagement section for engaging an engagement feature of a fastening element and a retaining section for retaining the dental component to be fastened by the fastening element, wherein the retaining section of the handling tool is configured to allow for a rotation relative to the dental component.

The fastening element is rotationally fixed by being engaged with the engagement section of the handling tool, whereas the dental component is releasably retained by the retaining section of the handling tool in the longitudinal direction. Nonetheless, the retaining section is configured so that a relative rotation between the retaining section of the handling tool and the dental component in the circumferential direction relative to the handling tool can be caused by applying an external torque. The external torque can be applied by hand or a tool using the grip of the handling tool. The difference of the interaction between the retaining section and the dental component in the longitudinal direction on the one hand and the circumferential direction on the other hand is that pulling the handling tool and the dental component apart will result in the retainment between these two parts being released, whereas turning the handling tool relative to the dental component will not separate the retaining section of the handling tool from the dental component. Instead, the handling tool keeps the dental component retained.

Further, the fastening element is not rotationally fixed in relation to the dental component. As a result, the dental component can be fastened to another dental component such as an implant or an abutment without causing a relative rotation between these components. Consequently, the handling tool can be used for attaching dental components to each other even if there are indexing means present.

In a preferred embodiment, the retaining section is shaped for retaining a dental component by means of a friction fit.

Using friction at the retaining section for retaining a dental component allows for above-mentioned longitudinal attachment of the dental component as well as relative rotation between the handling tool and the dental component. One of the advantages of a friction fit is the easy adjustment of the friction fit's strength by adjusting the geometric design and/or manufacturing tolerances of the retaining section.

The friction fit is configured to provide a releasable connection between the handling tool and the dental component. Thus, the dental component can be retained by the handling tool in a longitudinal direction for guiding the dental component to an attachment site. However, if pulled in a longitudinal direction away from each other, the handling tool and the dental component can be separated. This releasability of the friction fit also causes that a relative rotation between the handling tool and the dental component is possible.

In contrast to pulling the two parts apart, however, a rotation does not result in a disengagement of the dental component and the handling tool. Instead, rotation takes place against the friction fit and the handling tool keeps retaining the dental component while torque is applied. As a result, a user has an enhanced control over the fastening process. In other words, thanks to the friction fit, the connection between the handling tool and the dental component is stable so that a user has a good control and feedback while fastening the dental component to another dental component.

Since the rotation of the fastening element for tightening the fastening element and, thus, the dental component, to another dental component is effected about the longitudinal axis of the handle, the retaining section is preferably designed to be substantially rotationally symmetric. However, retaining elements may be provided on the face of the retaining section in order to adjust the strength of the frictional fit and/or form fit between the dental components.

In another preferred embodiment, the engagement section of the handling tool has a form fit geometry in order to enable a transfer of torque between the handling tool and a fastening element.

Using a form fit geometry provides an engagement section to the handling tool that allows for a high strength engagement in the rotational direction. In other words, the risk of any slippage between the handling tool and the dental component during tightening is minimized.

Further, a form fit ensures a defined behavior of the handling tool during its rotation while fastening the dental component to an apical dental component. More specifically, the rotation of the handling tool about its longitudinal axis will be fully transferred to the fastening element. As a result, there is no significant torque applied to the dental component during fastening of the dental component with the fastening element which otherwise could cause a relative rotation between the dental components. Also, there is no limitation on the transfer of torque from the handling tool to the fastening element so that a user will have a direct tactile feedback concerning the torque applied.

In another preferred embodiment, the engagement section of the handling tool has a friction fit geometry in order to limit the transfer of torque between the handling tool and a fastening element.

In this embodiment, the engagement section also has a friction fit geometry like the above described preferred embodiment of a retaining section mentioned above. However, the connection strength provided by the engagement section is higher than the connection strength provided by the retaining section so that any rotation of the handling tool about its longitudinal axis will be transferred to the fastening element.

However, if the fastening element is fastened up to a predetermined amount to an apical dental component, the continuous rotation of the handling tool will result in slippage of the handling tool in relation to the fastening element. Thus, slippage will occur at both sections, i.e. the engagement section as well as the retaining section. Consequently, this embodiment has the advantage that the amount of torque that may be applied by the handling tool is limited so that an overload of the dental assembly and in particular the dental implant can be prevented.

In another embodiment, the diameter of the grip is larger than any one of the diameter of the engagement section and the diameter of the retaining section.

Thus, on the one hand a user can easily grip the handling tool and control its rotation as well as the torque applied. On the other hand, the engagement section and the retaining section being smaller in diameter provides a good visibility of the site, where the dental component is to be installed, which enhances the guidance of the dental component in the oral cavity of a patient.

In a preferred embodiment, the handling tool further comprises an intermediate section. The intermediate section converges from the diameter of the grip down to the diameter of the engagement section and/or the diameter of the retaining section.

Consequently, the intermediate section is arranged between the grip on the one hand and the engagement section and the retaining section on the other hand. Since the handling tool has an intermediate section that converges instead of only having a simple step in diameter, the occurrence of visual obstructions at the site of fixation is prevented. Preferably, the intermediate section converges from the grip to the engagement section and/or the retaining section linearly or with a concave curvature towards the longitudinal axis of the handling tool in order to provide a smooth transition between the grip and the shaft of the handling tool.

In another preferred embodiment, the shaft includes a cutout, wherein the cutout preferably passes through the shaft or is formed by the engagement section.

Including a cutout in the shaft has the advantage that the elasticity of the shaft in a direction perpendicular to the longitudinal axis of the handling tool can be increased. As a result, the shaft is able to adapt to a larger range of manufacturing tolerances or even different dental components.

The cutout may be a recess on the circumferential side of the shaft transverse to the longitudinal axis or at the apical end of the shaft extending from an opening at the apical end of the shaft in a coronal direction along the longitudinal axis. Preferably, the cutout runs throughout the shaft forming a through hole. If the cutout is situated on the circumferential side of the shaft, it is preferably formed as a slotted or elongated hole.

In a particularly preferred embodiment, the position of the cutout along the longitudinal axis of the handling tool coincides at least partly with the position of the retaining section and/or engagement section along the longitudinal axis.

In this preferred embodiment, the cutout does not only provide more compliance in terms of manufacturing tolerances but also allows for an adjustment of the connection strength that the retaining section and/or the engagement section provide to the dental component and the fastening element, respectively.

Also, it is possible to form one of the retaining section and the engagement section as a cutout for the other one of the retaining section and the engagement section. This provides for an even more compact design of the handling tool since the cutout is not formed as an additional feature but by an advantageous placement of the retaining section and/or the engagement section along the shaft of the handling tool and relative to each other.

In another preferred embodiment, the circumference of the cutout is preferably rounded.

The rounded circumference prevents the occurrence of high stresses caused by the torque applied to the handling tool when fastening the fastening element. As a result, the risk of material failure is reduced. Further, the risk of an adverse effect on the patient due to failure of the handling tool is significantly reduced.

In another preferred embodiment, the handling tool further comprises at least one cavity that is located in the handling tool so that deviations in material thickness are minimized.

In this embodiment, the material thicknesses at different sections of the handling tool are kept in a relatively small range so that the handling tool can be efficiently produced, in particular using molding techniques such as injection molding.

In a particularly preferred embodiment, the handling tool is at least partly made out of a solid polymer or solid polymer composite, in particular PEEK or a PEEK composite.

Polymers are cheap in production so that their application offer a more cost efficient treatment. Also, polymers such as PEEK are known to be biocompatible and have sufficient material strength to be used for forming the handling tool. Further, it is possible to enhance material properties, in particular material strength, by using solid polymer composites. For example, a PEEK composite may be used that combines PEEK with a filler material such as $TiO_2$ and/or a fiber, for example a glass fiber or a carbon fiber.

Further, the invention provides a dental set comprising a handling tool, in particular a handling tool as described above, and a dental component, the handling tool having a longitudinal axis and a retaining section for retaining the dental component in a longitudinal direction, i.e. in a fixed position along the longitudinal axis, but allowing a rotation between the handling tool and the dental component about the longitudinal axis.

The handling tool and the dental component are preferably delivered to a user such as a dentist as a preassembled dental set. Preferably, the dental set is provided as a sterilized package. As described above, the retaining section has the advantage to provide a connection between the handling tool and the dental component that is sufficient to retain the dental component in a longitudinal direction an at the same time allows for a relative rotation between these two parts. Further, by retaining the dental component in longitudinal direction, the control during application of torque to the fastening element by the handling tool is enhanced.

In a preferred embodiment, a circumferential contact between the retaining section of the handling tool and a contact section of the dental component is configured to be discontinuous.

Since the circumferential contact between the retaining section of the handling tool and a contact section of the dental component is discontinuous, the friction fit between the handling tool and the dental component can be easily adjusted to a desired value. Using a discontinuous contact particularly allows for adjusting the friction fit to a level ensuring that the strength of the fit caused at the retaining section is less than the strength of the fit caused at the engagement section.

Preferably, the discontinuous contact between the retaining section and the contact section is achieved by the surface of one of the sections having an undulating geometry. For example, the retaining section of the handle may be an outer circumferential surface having a generally circular configuration as described above, whereas the contact section of the dental component surrounds the retaining section and has an undulating configuration or vice versa. As a result of the undulating geometry, the contact section of the dental component is in contact with the retaining section only at predetermined, preferably regular, intervals.

In another preferred embodiment of the dental set, a fastening element having a thread that is in engagement with a thread of the dental component, where said thread is out of engagement with the thread of the dental component when being fastened to a thread of an apical dental component.

The thread of the fastening element being engaged with a thread of a dental component that is to be fastened to another dental component is particular advantageous for a preassembled dental set. More specifically, such a threaded engagement fixes the position of the fastening element relative to the handling tool and the dental component. Also, the thread of the dental component at least initially guides the fastening element when mounting the dental component to an apical dental component by rotating the fastening element further.

The fastening element is fixed during preassembly so that any play is prevented that may cause the handling tool to go out of engagement with the dental component due to inertial forces caused by, for example, transporting the preassembled dental set. Consequently, providing a thread in the dental component for receiving the fastening element also supports a retaining section with a low strength friction fit in order to provide less connection strength at the retaining section than at the engagement section.

The invention also provides a method for assembling a dental component using a handling tool, in particular a handling tool as described above. The method comprises the steps of bringing an engagement section of the handling tool into engagement with an engagement feature of a fastening element and coupling a retaining section of the handling tool to a contact section of a dental component by a friction fit, wherein the friction fit allows for a relative rotation between the handling tool and the dental component.

This method according to the invention for assembling a dental component provides the advantages already described in relation to the handling tool and the dental set. This method may particularly be used for preassembling the handling tool, the fastening element and the dental component. This preassembly may be done before the dental set is delivered to the dental office for treatment. Nonetheless, the method may also be applied at the dental office in preparation for inserting and fixing the dental component in the mouth of a patient. In any case, the possibility to prepare the dental set in such a manner reduces the chairtime of the patient necessary for installing the dental component.

Preferably, the fastening element is inserted into the dental component before the handling tool is coupled to the dental component by the retaining section of the handling tool and the contact section of the dental component.

In a particularly preferred embodiment, the method also comprises the step of bringing a thread of the fastening element into a threaded engagement with a thread of the dental component, and preferably the step of further rotating the fastening element relative to the dental component for bringing the thread of the fastening element out of engagement with the thread of the dental component and into engagement with a thread of an apical dental component.

This embodiment of the method has the previously described advantage of fixing the screw in a preassembled dental set as well as guiding the screw into engagement with an apical dental component.

BRIEF DESCRIPTION OF THE FIGURES

The following figures illustrate preferred embodiments of the present invention. These embodiments are not to be construed as limiting but merely to enhance the understanding of the invention. In these figures, same reference signs refer to components throughout the drawings that have the same or an equivalent function and/or structure. This also applies to reference signs that are identical except for the first digit that denotes different embodiments. Consequently, a repetitive description of these components is generally omitted.

FIGS. 7a and 7b show a side view and a cross-sectional side view of the application of the handling tool illustrated in FIGS. 5 and 6 for fixing a dental component to another, apical dental component with a fastening element.

DETAILED DESCRIPTION OF PREFERRED EMBODIMENTS

Figure 1:
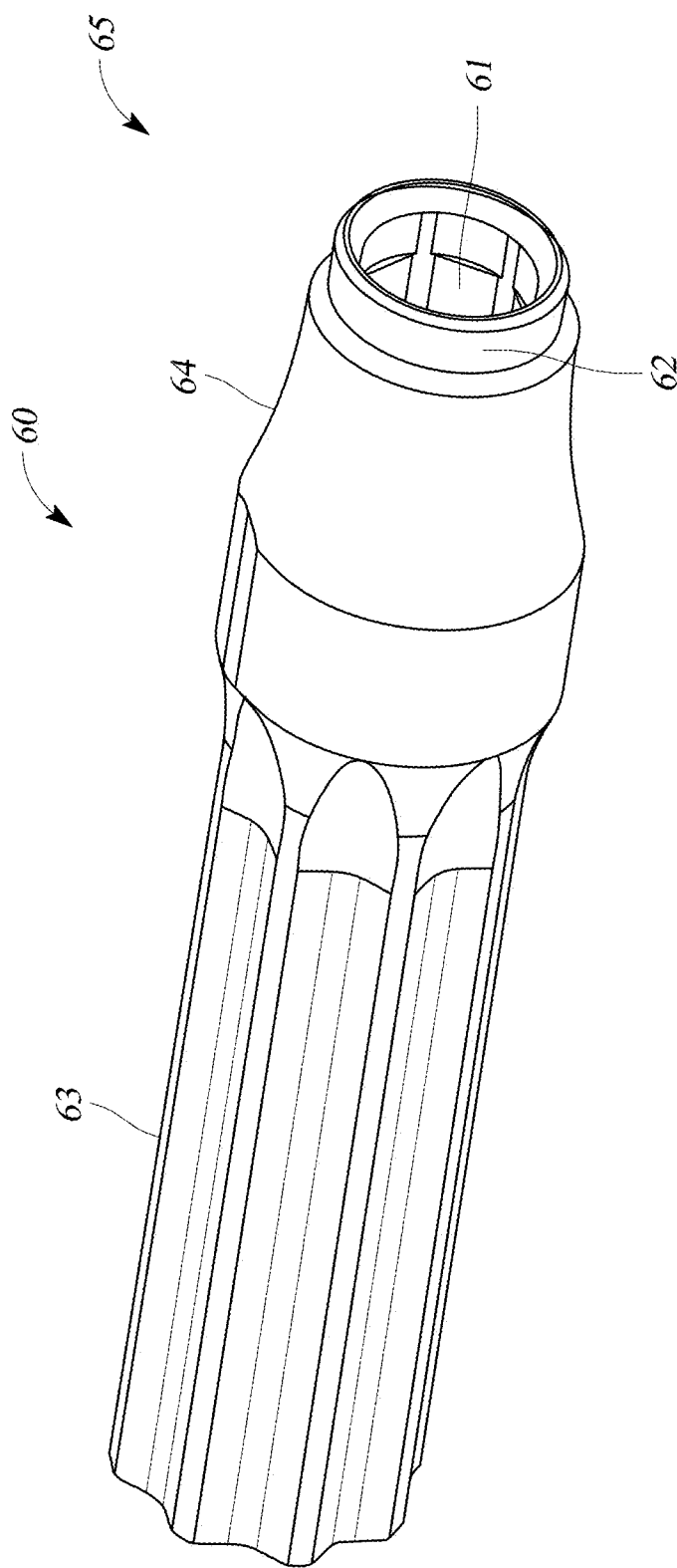
FIG. 1 illustrates a perspective view of a handling tool according to the present invention.
Figure 2A:
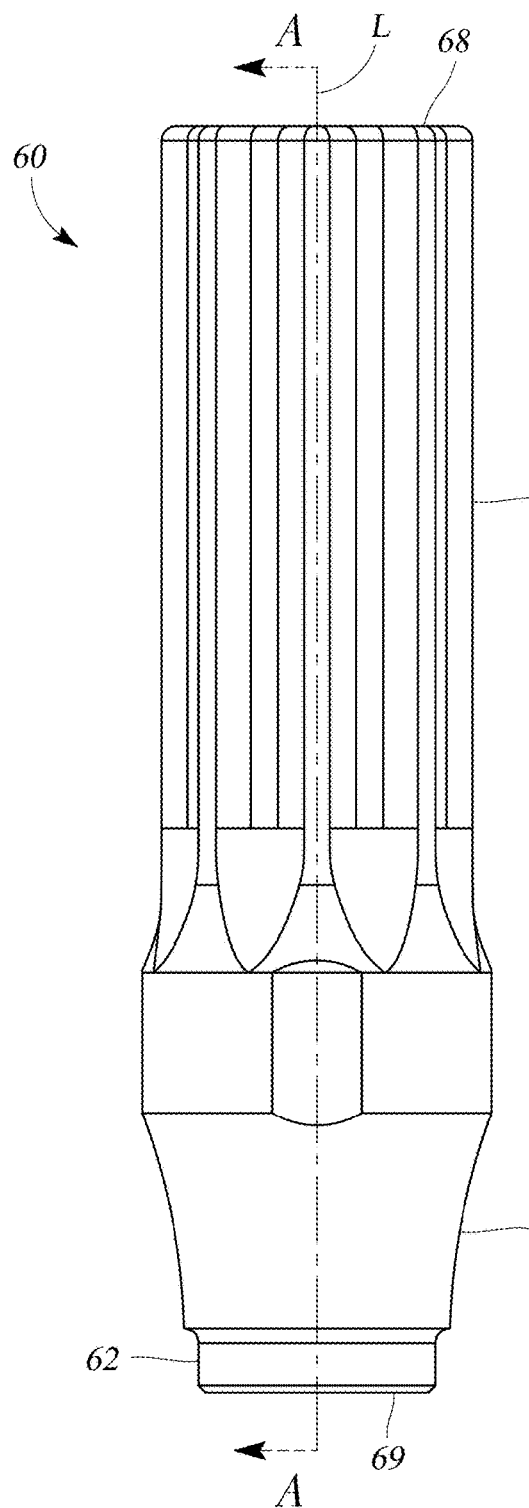
FIG. 2a illustrates the handling tool of FIG. 1 in a side view.
Figure 2B:
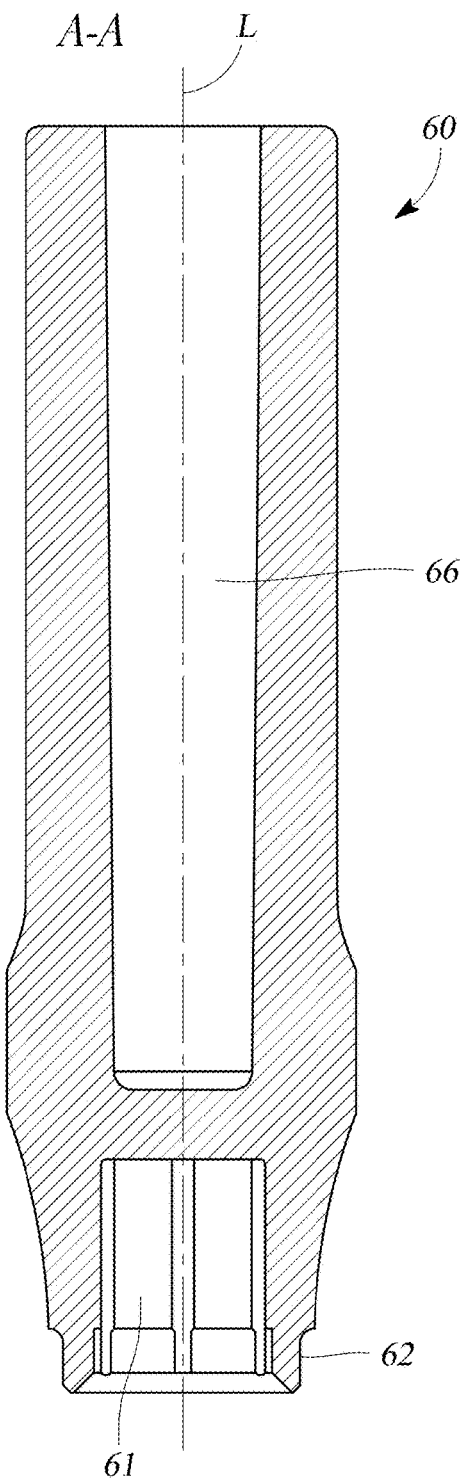
FIG. 2b is a cross-sectional side view of the handling tool.

FIGS. 1, 2a and 2b show a first embodiment of a handling tool 60 according to the invention for attaching and fastening two dental components to each other. A dental component may be an implant 10, a spacer, an abutment 20, 40 and/or a prosthetic tooth. The handling tool 60 is elongated and has a proximal end 68 and a distal end 69. At the proximal end 68 is a grip 63. The grip 63 may have a structured circumferential surface such as the longitudinal grooves shown in FIGS. 1 and 2a to provide a better grasp to a user.

At the distal end 69, the handling tool 60 comprises on its outer circumferential side a retaining section 62. In between the retaining section 62 and the grip section 63, the handling tool 60 may include an intermediate section, where the diameter of the handling tool 60 decreases down to the diameter of the retaining section 62 and/or engagement section 61. As can best be seen in FIG. 2, the decrease of the diameter is preferably formed as a linear or concave convergence in the distal direction of the handling tool 60 along the longitudinal axis L.

The retaining section 62 is for retaining a dental component 20, 40. In other words, a dental component 20, 40 may be coupled to the retaining section 62 of the handling tool 60 so that the dental component 20, 40 is detachably coupled to the handling tool 60. The retaining function is achieved by a friction fit and/or a form fit. In both cases, the retaining section 62 allows for a rotation of the dental component 20, 40 about the longitudinal axis L of the handling tool 60. Thus, the retaining section 62 has a geometry that allows for a rotation of the handling tool relative to the dental component such as a generally circular geometry.

Preferably, the retaining section 62 retains a dental component 20, 40 with a friction fit. A friction fit can be achieved with a simple geometry such as a circular circumferential surface. In this manner, the friction fit allows for a rotation of the dental component 20, 40 relative to the handling tool 60. However, it is also possible to provide, for example, an increased connection strength of the friction fit by including retaining elements 67a, 67b, 67c on the retaining section 62 (cf. FIG. 4). In other words, a friction fit can be adjusted to a desired connection strength that is to be provided by the retaining section 62 so that the dental component is securely retained in the longitudinal direction of the handling tool 60 but allows for a rotation about the longitudinal axis L.

Nonetheless, it is also possible to include a snap-fit geometry as retaining section 62. This can be an alternative or complementary feature to the aforementioned friction fit. Such a snap-fit geometry also needs to provide the previously described retaining function in the longitudinal direction as well as the rotational function about the longitudinal axis L. This may be achieved by providing a continuous circumferential groove or ridge on the retaining section 62 of the handling tool 60 and/or the contact section 21, 41 of the dental component 20, 40.

The handling tool 60 also comprises an engagement section 61. In the embodiment of the handling tool 60 shown in FIGS. 1 to 4, the engagement section 61 is formed at the distal end 69 of the handling tool 60 as a recess extending along the longitudinal axis L into the shaft 65 of the handling tool 60.

As illustrated in FIGS. 1 and 2b, the engagement section 61 has a geometry that brings a fastening element 30 in a rotational direction about the longitudinal axis L into engagement. However, the geometry of the engagement section 61 is also formed to allow for a translation of the fastening element 30 along the longitudinal axis L. As a result, the fastening element 30 moves distally in relation to the handling tool 60 while the handling tool 60 is rotated and the fastening element 30 increasingly engages the apical dental component 20, 40 by means of its thread 31.

In the exemplary embodiment shown in FIG. 1, the engagement section 61 has a hexagonal geometry. However, any geometry that provides a rotational engagement about the longitudinal axis L and at the same time allows for a translation of a fastening element 30 along this longitudinal axis L is suitable to be used as engagement section 61.

The handling tools 60, 160 are preferably made from a polymer such as PEEK since polymers allow for a cheap high volume production so that the handling tool 60 may simply be provided as a disposable part.

As illustrated in FIG. 2b, the handling tool 60 comprises a cavity 66 on the level of the grip section 63 along the longitudinal axis L. In this manner, the handling tool 60 comprises less deviations in material thickness, which facilitates production, for example by injection molding. Preferably, the change in material thickness between adjacent cross sections of the handling tool, in particular at locations with a step change, is less than 250%, preferably less than 150% and even more preferably 100% relative to the thinner section. The same applies to the handling tool 160 which includes the cavity 166 for the same purpose.

Figure 3A:
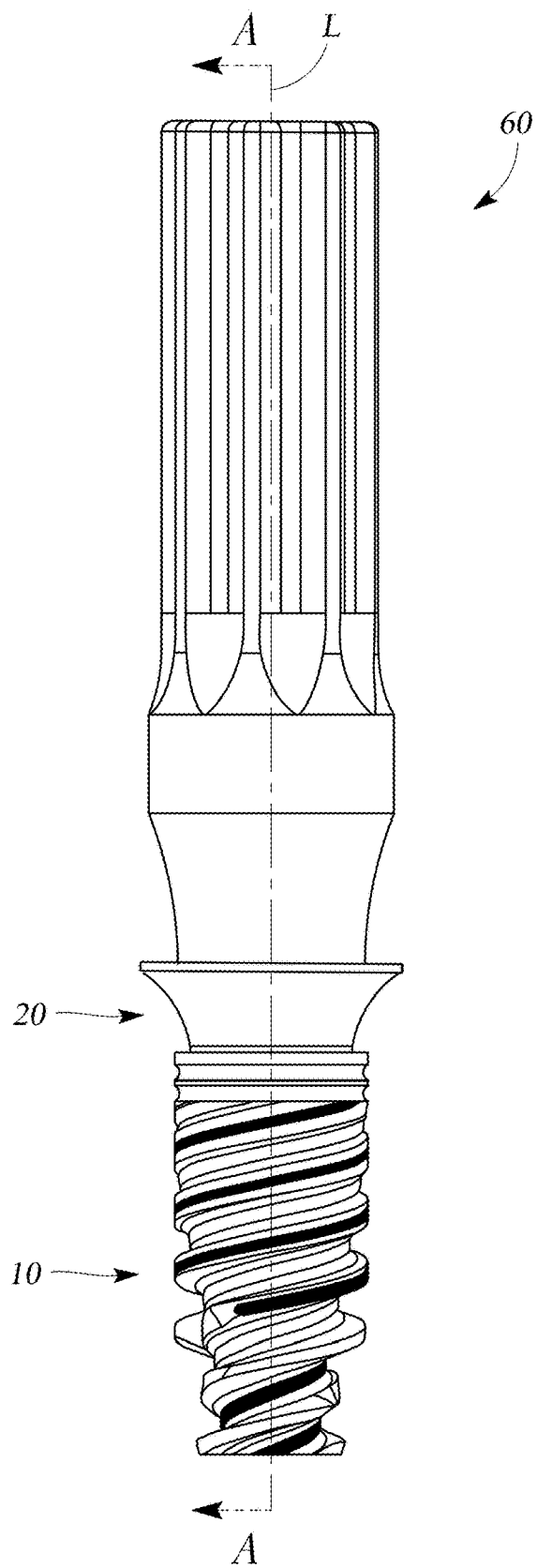
FIGS. 3a to 3d show the application of the handling tool of the previous figures for attaching and fixing a dental component with a fastening element to an adjacent apical dental component.
Figure 3B:
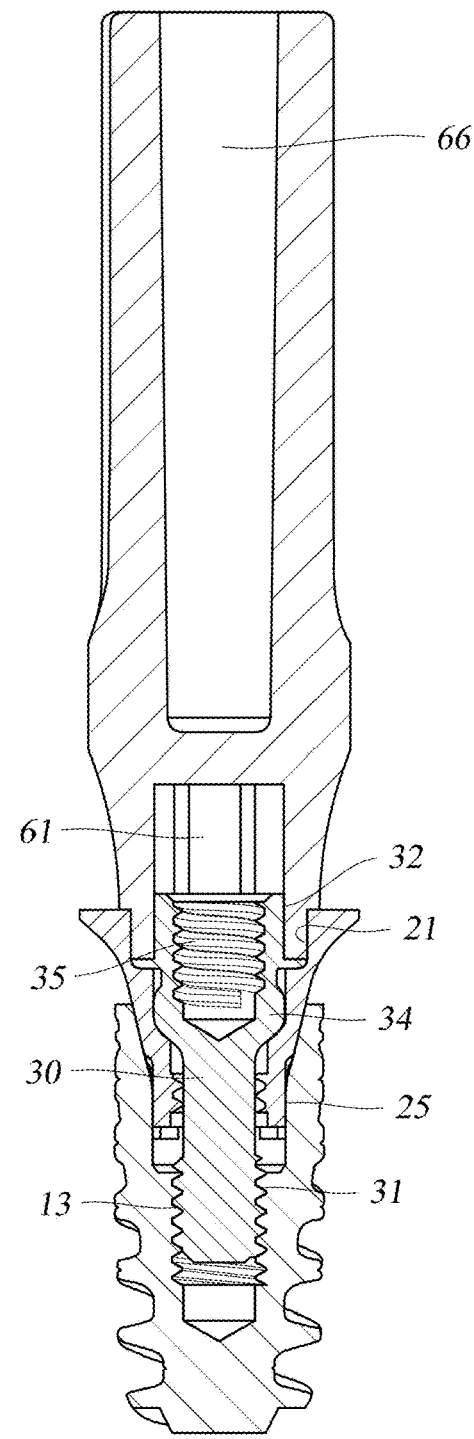
Figure 3C:
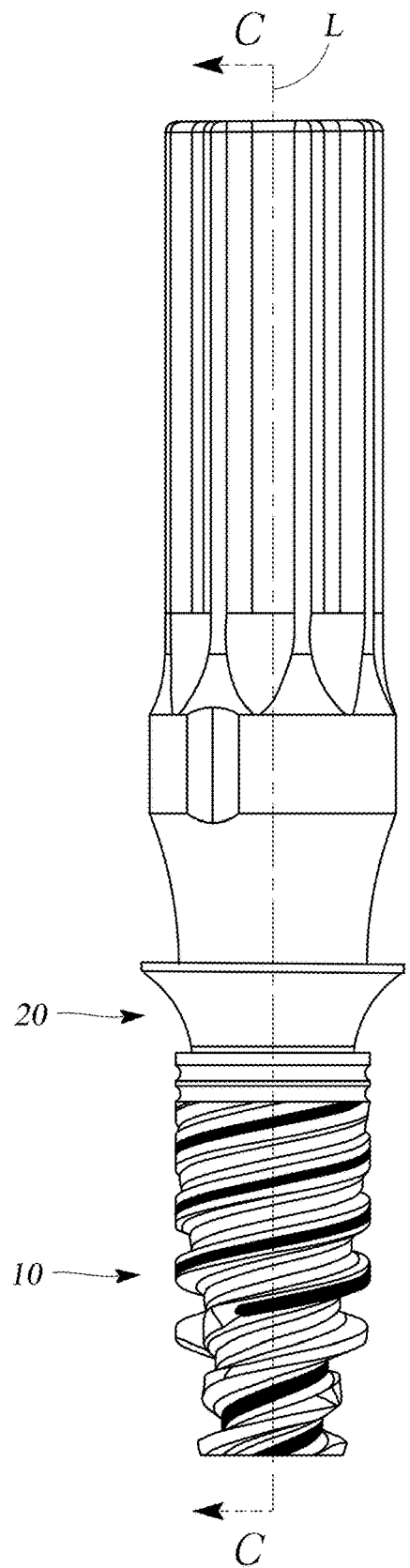

FIGS. 3a and 3b illustrate the application of the handling tool 60 at the end of tightening a dental component 20 to an apical dental component 10 as a side view and a cross-sectional side view, respectively. In FIG. 3, the apical dental component 10 is a dental implant and the dental component 20 is an abutment. It will be understood by the skilled person, that the dental components can be any suitable dental component to build up a dental prosthesis or superstructure. For example, in FIG. 7 described in further detail below, a sleeve or coronal abutment 40 is fastened to an apical abutment 20.

As can be taken from FIG. 3b, the dental implant 10 comprises an inner thread 13 for engagement with an outer thread 31 of the fastening element 30. The fastening element 30 in FIG. 3 is a dental screw including a screw head 34 and a shaft. The shaft comprises at its distal end the outer thread 31. The screw head includes on its outer circumference an engagement feature 32 for engaging the engagement section 61 of the handling tool 60. It also comprises an inner thread 35 for a threaded engagement with another fastening element 130 that will be described in more detail in relation to FIG. 7 below.

The dental component 20 comprises a through hole passing through the component along its longitudinal direction for insertion of the fastening element 30. At the coronal end of the through hole, the dental component 20 includes a contact section 21 for coupling to the retaining section 62 of the handling tool 60. The contact section is formed as an inner circumferential surface that is substantially parallel to the longitudinal axis L to allow for a translation when being in contact with the fastening element. Apically to the contact section 21, the dental component 20 further comprises a screw seat so that the dental component 20 can be fixedly attached to the dental component 10.

Figure 3D:
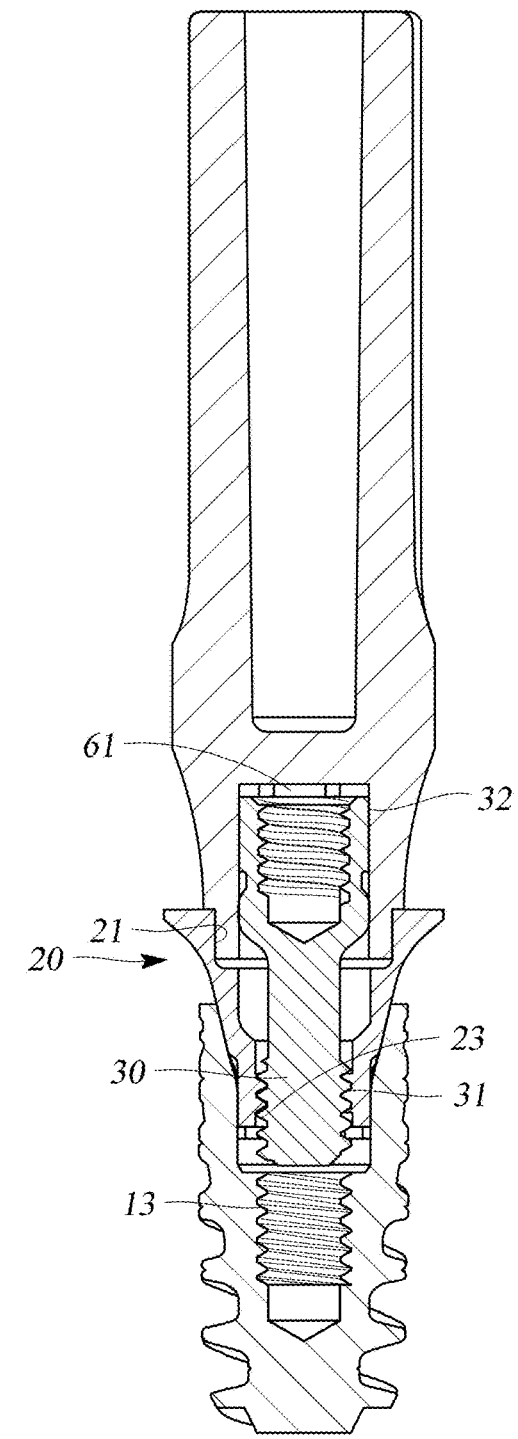

At the apical end of the through hole, the dental component 20 can be provided with an inner thread 23. As illustrated in FIG. 3d, the inner thread 23 serves for an engagement with the outer thread 31 of the fastening element 30 in a preassembled state. As described above, the handling tool 60, the dental component 20 and the fastening element 30 are preferably preassembled in order to provide a ready to use dental set to the patient and to reduce the chairtime of the patient during treatment.

The preassembly of the dental set in the exemplary embodiment shown in FIG. 3 is performed by rotating the fastening element 30 into a threaded engagement with the inner thread 23 of the dental component 20. This is followed by moving the engagement section 61 of the handling tool 60 along the longitudinal axis L onto the screw head 34 into engagement with the engagement feature 32 of the fastening element 30 and subsequently bringing the retaining section 62 of the handling tool 60 in contact with the contact section 21 of the dental component 20. In this exemplary embodiment, the dental component 20 also comprises indexing means to lock the dental component 20 and the dental component 10, i.e. in the present embodiment the implant, in the rotational direction.

This preassembled dental set is then transferred into the oral cavity of a patient and guided to the dental component 10. More specifically, the dental component 20 is guided into a corresponding recess of the dental component 10 for receiving the dental component 20. This results in the situation illustrated in FIG. 3d.

Since in the embodiment shown in FIG. 3 the fastening element 30 is in threaded engagement with the dental component 20, the fastening element does not loosely extend from the preassembled dental set. As a result, the fastening element 30 does not hinder guiding the preassembled dental set to the dental component 10 within the oral cavity of the patient.

In order to fix the dental component 20 to the dental component 10, the fastening element 30 is rotated by turning the handling tool 60 about its longitudinal axis L. As a result, the outer thread 31 of the fastening element 30 advances in an apical direction out of engagement with the inner thread 23 of the dental component 20 and further into engagement with the inner thread 13 of the dental component 10. In the fixed or tightened state, the outer thread 31 is completely out of engagement with the inner thread 23 so that a reliable fastening of the dental component 20 to the dental component 10 is achieved.

On the one hand, during rotation in a fastening direction, the fastening element 30 moves out of the engagement section 61 of the handling tool 60 in an apical direction. Consequently, the engagement between the engagement section 61 of the handling tool 60 and the engagement feature 32 of the fastening element 30 is present only in terms of rotation about the longitudinal axis L but not in terms of translation along this longitudinal axis.

On the other hand, the retaining section 62 of the handling tool 60 being in contact with the contact section 21 of the dental component 20 provides a friction fit that retains the dental component 20 in a fixed position relative to the handling tool 60 along the longitudinal axis L as long as no external force is applied along this direction but allows for a relative rotation of the handling tool 60 in relation to the dental component 20. Although the friction fit transfers a minimal torque between the handling tool 60 and the dental component 20 while rotating the handling tool 60 during fastening of the dental component 20, this torque does not affect the integrity of the dental implant 10 with the surrounding bone tissue of the patient.

Generally, the strength of the connection between a retaining section 62, 162 of a handling tool 60, 160 and a dental component 20, 40 in a rotational direction about the longitudinal axis L of the handling tool 60, 160 is less than the strength of the connection between an engagement section 61, 161 of the handling tool 60, 160 and the dental component 20, 40.

This difference in strength is provided in the embodiment of FIG. 3 by using a form fit between the fastening element 30 and the handling tool 60 and a friction fit between the handling tool 60 and the dental component 20. As a result, slippage can only occur between the handling tool 60 and the dental component 20.

However, this precondition can also be fulfilled in case of using a friction fit between the handling tool 60 and the fastening element 30 on the one hand and the dental component 20 on the other hand (cf. FIG. 7).

After fastening the dental component 20 to the dental component 10 by means of the fastening element 30, the handling tool 60 can easily be removed by pulling the handling tool 60 in an apical direction.

Figure 4C:
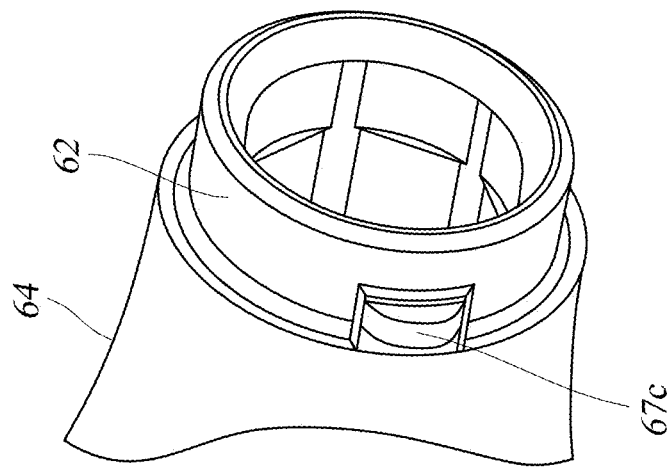
FIGS. 4a to 4c illustrate embodiments of retaining elements that can be formed on a circumferential face of a retaining section in order to enhance friction of the retaining section.
Figure 4B:
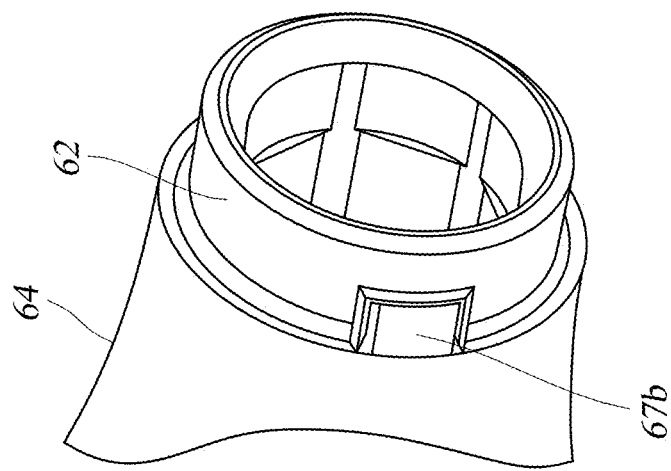
Figure 4A:
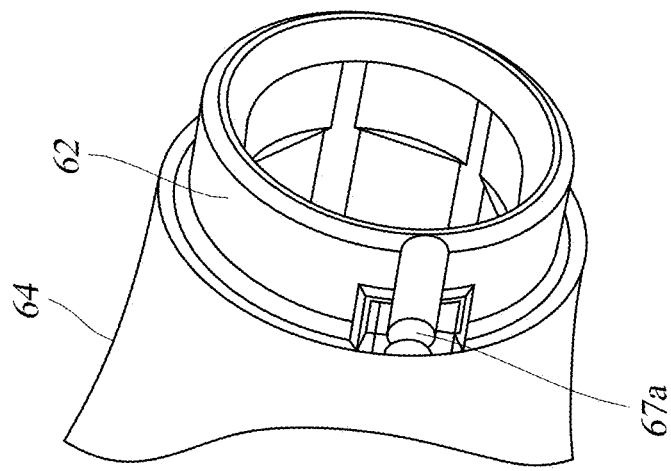

Turning to FIG. 4, FIG. 4 illustrates three retaining elements 67a, 67b, 67c that may additionally be provided on the retaining section 62 of the handling tool 60. These retaining elements 67 may be provided as protrusions 67a, 67b, 67c that locally increase the friction fit and/or provide a form fit between the handling tool 60 and a dental component 20, 40. Additionally or alternatively, the retaining elements 67a, 67b, 67c may have elastic properties similar to a leaf spring for providing a defined local contact force between the handling tool 60 and the dental component 20, 40 to obtain a predetermined friction fit and/or form fit.

The retaining elements 67 are preferably provided in an equidistant manner around the circumference of the retaining section 62. Preferably, 1 to 6 protrusions and more preferably 2 to 4 protrusions are formed on the circumferential surface of the retaining section 62.

Figure 5:
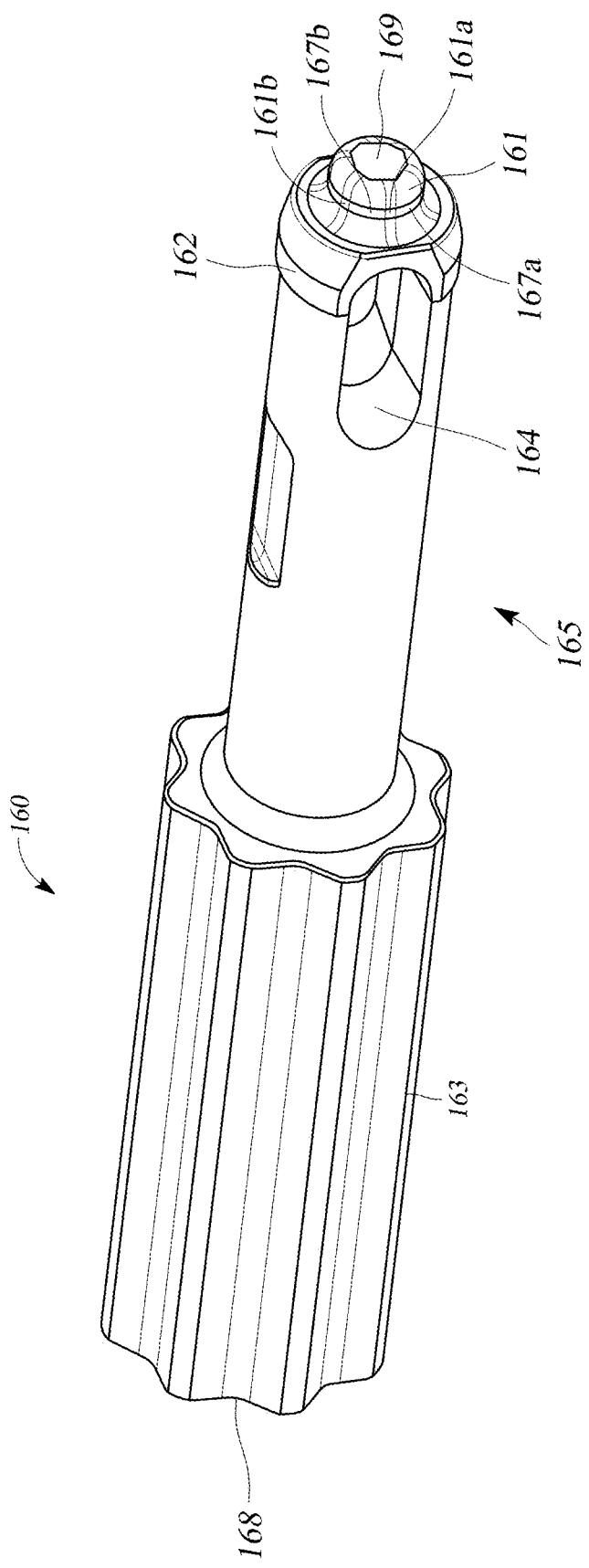
FIG. 5 shows another embodiment of a handling tool according to the present invention.

FIG. 5 shows another embodiment of a handling tool according to the invention denoted with reference sign 160. As can be taken from the first digit of the reference signs in relation to the embodiment of the invention described in the following, the basic structure of the handling tool 160 is similar to the previously described handling tool 60. For example, like the handling tool 60, the handling tool 160 comprises at its proximal end a grip 163 and at its distal end a shaft 165 including a retaining section 162 and an engagement section 161. However, the retaining section 162 and the engagement section 161 are at least partly not provided on the same level as the retaining section 62 and the engagement section 61 of the handling tool 60 but instead one after the other. More specifically, the engagement section 161 is situated at the distal end 169 of the handling tool 160 and the retaining section 162 is located proximally thereof.

Like in the embodiment of the handling tool 60 of the previous figures, the engagement section 161 is configured for engagement with a fastening element 130 by at least a partial form fit in order to apply torque. As illustrated in FIG. 5, the engagement section 161 may be formed by a plurality of engagement subsections 161a, 161b. These engagement subsections 161a, 161b are located on the circumference of the engagement section 161. In the present embodiment, the engagement subsections 161a, 161b are planar and are separated by intermediate subsections 167a, 167b. In other words, the engagement subsections 161a, 161b alternate with intermediate subsections 167a, 167b around the circumference of the engagement section 161 in order to form a preferably regular pattern. The intermediate subsections 167a, 167b are formed so that they do not engage a corresponding engagement feature 132 of a fastening element 130. The number of engagement subsections 161a, 161b is preferably equal to the number of intermediate subsections 167a, 167b. Further, the number of engagement subsections 161a, 161b is chosen according to an engagement feature 132 of a fastening element 130. For example, if the engagement feature 132 is formed by a hexagonal geometry, there will be preferably six planar engagement sections 161a, 161b.

In longitudinal direction, the engagement section 161 is configured for engagement with the fastening element 130 by friction fit in order to retain the fastening element 130 on the handling tool 160.

The skilled person will appreciate that the engagement subsections 161a, 161b do not necessarily have to be planar but can also have any other geometry as long as this geometry is able to at least partially engage an engagement feature 132 of a fastening element 130. Nonetheless, these engagement subsections 161a, 161b are preferably formed to only partly engage an engagement feature 132. In this manner it is possible to limit the amount of torque that is applied by the engagement section 161 of the handling tool. In other words, providing engagement subsections 161a, 161b to the handling tool that only partly engage an engagement feature 132 of a fastening element 130 allow for slippage between the handling tool 160 and the fastening element 130 if the torque applied by the handling tool 160 exceeds a predetermined amount.

Also, the handling tool 160 does not comprise an intermediate section 64, where the diameter of the handling tool continuously converges down from the grip 163 to the retaining section 162 and the engagement section 161. Instead, the grip section 163 is designed relatively shorter in the longitudinal direction of the handling tool 160 and comprises a step change to the smaller diameter of the shaft 165 in order to provide a good visibility of the attachment site, and in particular to facilitate larger prosthetic restorations. Preferably, the grip section 163 is formed at the proximal end 168 along about half of the length or less of the total length of the handling tool 160 in the distal direction.

Another difference to the handling tool 60 of FIGS. 1 to 4 is a cutout 164 near the distal end 169 of the handling tool 160. The cutout 164 extends in a transverse direction throughout the shaft 165. As already described above, the recess forming the cutout 164 also enables the adjustment of the shaft's elasticity and, in particular, the retaining section 162.

In case of the handling tool 60 of the previous embodiment, such a recess may also be formed by the engagement section 61. Here, the location of the engagement section 61 also enhances the elasticity of the retaining section 62 since both sections are located on the same level along the longitudinal axis L of the handling tool 60.

Figure 6A:
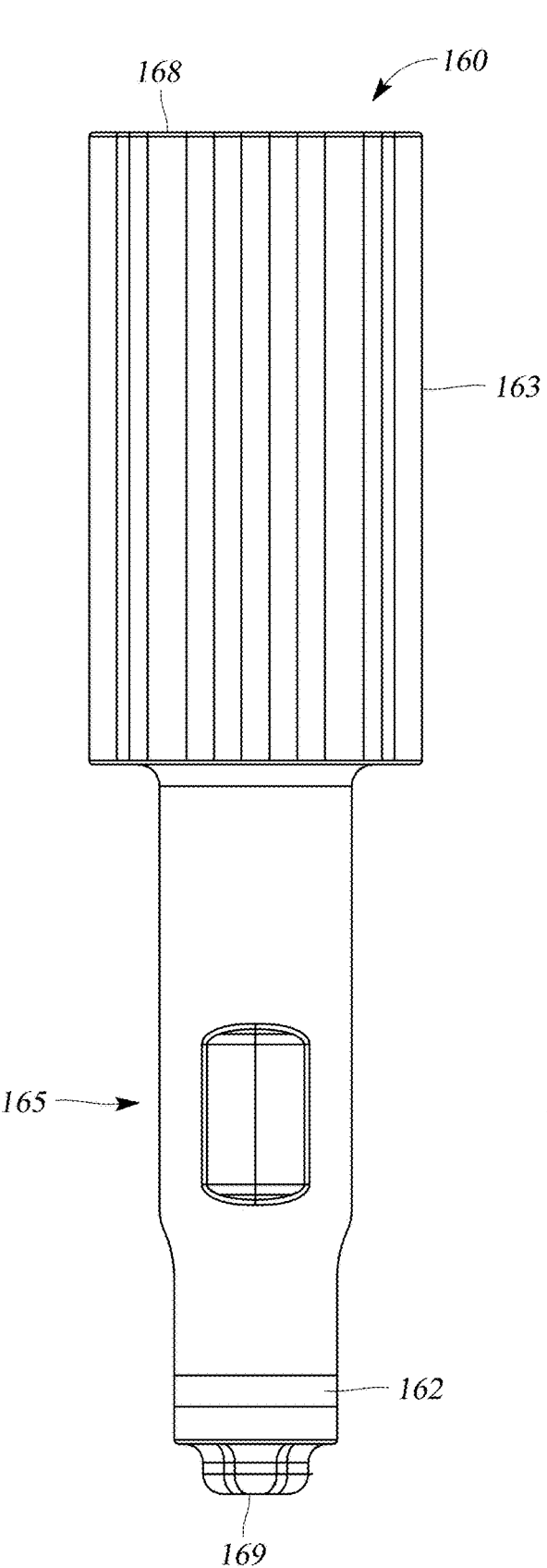
FIGS. 6a and 6b show different side views of the handling tool illustrated in FIG. 5.
Figure 6B:
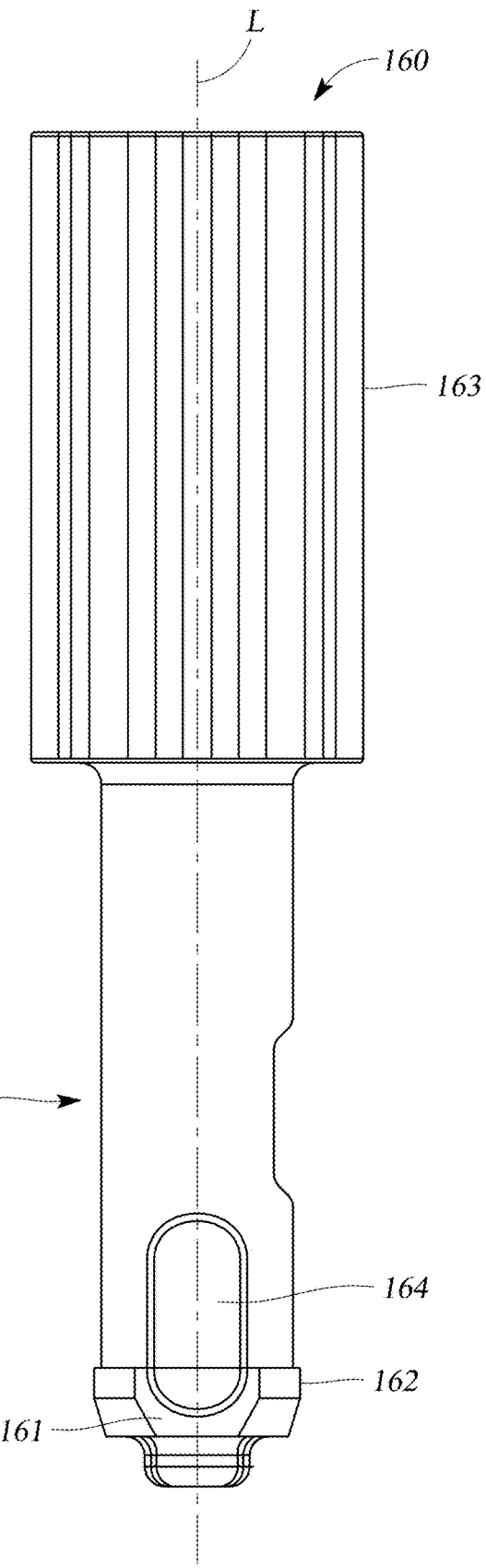

In the exemplary embodiment of FIGS. 5 to 7, the cutout 164 extends into the region of the retaining section 162 along the longitudinal axis L of the handling tool 160. In this manner, the elasticity of the retaining section 162 is increased. Also, the cutout 164 extending further along the shaft 165 towards the proximal end 168 can ensure an easy rotation of the handling tool 160 within the through hole of a dental component 40 (cf. FIG. 7b).

As previously described in relation to an embodiment of the handling tool, the cutout 164 comprises a rounded circumference in order to prevent the occurrence of high stresses within the material of the handling tool 160. Although the cutout 164 is formed as a slot or elongated hole extending throughout the transverse direction of the shaft 165, it may well be sufficient to form the cutout 164 as a recess that does not form a through hole but has a bottom. In such an embodiment, the cutout 164 is preferably provided as more than one recess located in an equidistant manner around the circumference of the shaft 165.

As can further be taken from FIGS. 5 and 6, the retaining section 162 is not formed as a continuous retaining section but instead comprises two retaining subsections that are opposed to each other and are separated by the cutout 164.

Subdividing the retaining section into a plurality of subsections that may be separated by the cutout or are simply separated by sections between the subsections with a decreased dimension, i.e. a distance in a direction perpendicular to the longitudinal axis L. This is another option to adjust the strength of the friction fit to the desired value needed to retain the dental component 40 at a fixed position along the longitudinal axis L of the handling tool 160 while allowing for a rotation of the handling tool 160 in relation to the dental component 40 about that longitudinal axis L.

The application of the handling tool 160 is best described in relation to FIGS. 7a and 7b. As previously described, the dental component 40, the handling tool 160 and the fastening element 130, which in the embodiment shown in FIG. 7 is formed as a dental screw, are inserted into the mouth of a patient in a preassembled state. The dental component 40 comprises a through hole like the previously described dental component 20 but without an internal thread at its apical end.

During preassembly, the fastening element 130 is inserted into the dental component 40 followed by the retaining section 162 of the handling tool 160. By pushing the fastening element 130 and the handling tool 160 into the through hole of the dental component in an apical direction until the fastening element 130 abuts the screw seat, the fastening element 130 is prevented from moving in the longitudinal direction during the insertion of the dental set into the mouth of the patient. Consequently, in this embodiment, the retaining section 162 of the handling tool also has the function of retaining the fastening element 130, which in the previous embodiment is achieved by the inner thread 31 of the fastening element 30.

During placement of the dental set and, i.e. the placement of the dental component 40 on the dental component 20, the fastening element 130 is pushed back within the through hole in a coronal direction of the dental component 40.

The dental component 20 may comprise an undulating contact section as described above for coupling the dental component 40 to the dental component 20. This undulating contact section 21 may serve as an indexing means for preventing a rotation between these two components. If the circumferential contact section 21 of the dental component 20 has an undulating geometry, the friction fit between the handling tool 60 and the dental component 20, previously described in relation to FIG. 3, is established discontinuously around the circumference of the retaining section 62 of the handling tool 60. As described above, this allows to manipulate the connection strength of the friction fit.

Once the dental component 40 is placed on the dental component 20, the fastening element 130 can be advanced into a threaded engagement with the inner thread 35 of the previously described fastening element 30 located at the head of the fastening element 30 by rotating the handling tool 160. Since the at least partial form fit engagement between the engagement section 161 of the handling tool 160 and the engagement feature 132 of the screw has a higher connection strength than the connection caused by the contact of the retaining section 162 of the handling tool 160 with the contact section 41 of the dental component 40, slippage only occurs between the retaining section 162 and the contact section 41.

However, as soon as the fastening element 130 is tightened to the inner thread 35 of the fastening element 30 up to a predetermined torque value, the geometry and/or dimensions of the engagement subsections 161a, 161b may be configured as previously described, to allow slippage to occur between the engagement section 161 and the contact section 132. Thus, in such an embodiment, a better tactile feedback is provided to a user by the handling tool 160 in the form of slippage that occurs as soon as a maximum torque is reached. In this manner, any damage to the dental components or the interface between a dental component and the tissue of the patient can be prevented.

After tightening the fastening element 130, the handling tool 160 can easily be removed by pulling the handling tool 160 in an apical direction. Thus, neither during insertion of the dental set nor during removal of the handling tool there is a risk that a component of the dental set gets lost within the oral cavity of the patient.

In the present disclosure, the handling tools 60 and 160 are used for assembling a multiunit abutment, in particular a two-piece abutment. However, it will be clear to the skilled person that either of the handling tools may also be used to install a one-piece abutment or any other dental component mentioned above.

It will also be understood by the skilled person that the above described embodiments of a handling tool, a dental component and a fastening element can be modified in order to replace an inner feature by an outer feature. For example, the engaging section 61 of handling tool 60 can be located on the outer circumference and the retaining section 62 can be located on the inner circumference of the recess.

REFERENCE SIGNS 10 apical dental component or implant
13 inner thread
20 first dental component
21 contact section
23 inner thread
25 indexing means
30 fastening element such as an implant screw
31 outer thread
32 engagement feature
34 screw head
35 inner thread
40 second dental component
41 contact section
60 handling tool
61 engagement section
62 retaining section
63 grip
64 intermediate section
65 shaft
66 cavity
67 retaining elements
68 proximal end
69 distal end
130 fastening element such as a prosthetic screw
131 outer thread
132 engagement feature
160 handling tool
161 engagement section
161a,b engagement subsections
162 retaining section
163 grip
164 cutout in the transverse direction
165 shaft
166 cavity
167a,b intermediate subsections
168 proximal end
169 distal end
L longitudinal axis

The invention claimed is:

1. A dental set comprising a handling tool and a dental component, the handling tool having a longitudinal axis and a retaining section for retaining the dental component in a longitudinal direction but allowing a rotation between the handling tool and the dental component about the longitudinal axis, wherein the handling tool further comprises a grip and an intermediate section, the grip located proximally to the retaining section, an outer surface of the intermediate section comprising a concave curvature, the concave curvature extending towards the longitudinal axis of the handling tool, wherein the grip comprises a first diameter and the retaining section comprises a second diameter, the second diameter being smaller than the first diameter, and wherein the handling tool further comprises:
a shaft comprising the retaining section and an engagement section located on a same level along the longitudinal axis as the retaining section, wherein the engagement section comprises a recess extending along the longitudinal axis into the shaft, wherein an interior surface of the recess of the engagement section has a form fit geometry and a first non-round cross-section perpendicular to the longitudinal axis, or a cutout extending throughout a transverse direction of the retaining section, wherein the cutout terminates proximal to a distal end of the handling tool, wherein the cutout comprises a second non-round cross-section perpendicular to the longitudinal axis.

2. The dental set according to claim 1, wherein a circumference of the cutout is rounded.

3. The dental set according to claim 1, wherein a circumferential contact between the retaining section of the handling tool and a contact section of the dental component is discontinuous.

4. The dental set according to claim 1, further comprising a fastening element having a thread that engages a thread of the dental component and that is out of engagement with the thread of the dental component when being fastened to a thread of an apical dental component.

5. The dental set according to claim 1, wherein the retaining section is located on an outer circumferential side of the shaft and is configured to contact the dental component, wherein the retaining section of the handling tool is configured to allow for a rotation relative to the dental component.

6. The dental set according to claim 1, wherein the retaining section is shaped for retaining the dental component by means of a friction fit.

7. The dental set according to claim 1, wherein the first diameter of the grip is larger than a diameter of the engagement section.

8. The dental set according to claim 7, wherein the intermediate section converges from the first diameter of the grip down to the diameter of the engagement section and/or the second diameter of the retaining section.

9. The dental set according to claim 1, further comprising at least one cavity which is located in the handling tool so that deviation in material thickness is minimized.

10. The dental set according to claim 1, wherein the handling tool is at least partly made from a solid polymer or solid polymer composite.

11. The dental set according to claim 1, wherein the handling tool is at least partially made from PEEK or PEEK composite.

12. The dental set according to claim 1, wherein the shaft, the engagement section, and the retaining section are integrally formed.

13. The dental set according to claim 1, wherein the handling tool is one piece.

14. The dental set according to claim 4, wherein the apical dental component is a dental implant and the dental component is an abutment.

15. The dental set according to claim 14, wherein the handling tool and the abutment are preassembled prior to transferring the handling tool and the abutment into an oral cavity of patient.

16. The dental set according to claim 1, wherein the interior surface of the recess comprises a hexagonal geometry.

17. The dental set according to claim 16, wherein the hexagonal geometry comprises six planar engagement sections.

18. the dental set according to claim 1, wherein the handling tool comprises a step change from the first diameter of the grip to the second diameter of the retaining section.

* * * * *